United States Patent
Denehy et al.

(10) Patent No.: US 6,562,425 B2
(45) Date of Patent: May 13, 2003

(54) CARRIER RELEASE SHEET FOR STYRENE MOLDING PROCESS AND PROCESS AND SYSTEM

(75) Inventors: Daniel G. Denehy, Whately, MA (US); Eric D. Tuttle, Guilford, VT (US)

(73) Assignee: Pliant Corporation, Schaumburg, IL (US)

( * ) Notice: Subject to any disclaimer, the term of this patent is extended or adjusted under 35 U.S.C. 154(b) by 0 days.

(21) Appl. No.: 09/973,428

(22) Filed: Oct. 9, 2001

(65) Prior Publication Data

US 2002/0034634 A1 Mar. 21, 2002

Related U.S. Application Data

(63) Continuation of application No. 09/406,494, filed on Sep. 27, 1999, which is a continuation of application No. 08/909,541, filed on Aug. 12, 1997, now Pat. No. 5,985,391.
(60) Provisional application No. 60/023,818, filed on Aug. 12, 1996.

(51) Int. Cl.$^7$ .................... B29D 22/00; B29D 23/00; B32B 1/08
(52) U.S. Cl. .................. 428/36.6; 428/36.7; 428/474.4; 428/476.3; 428/522; 426/127; 264/173.11; 264/173.12; 264/173.16; 264/176.1; 264/331.12
(58) Field of Search .............................. 428/36.6, 36.7, 428/474.4, 476.3, 522; 426/127; 264/173.11, 173.12, 176.1, 173.16, 331.12

(56) References Cited

U.S. PATENT DOCUMENTS

| 3,734,814 A | 5/1973 | Davis .................. 428/123 |
| 3,791,915 A | 2/1974 | Goehring et al. ........ 428/476.3 |
| 3,895,988 A | 7/1975 | Miller ................... 156/245 |
| 3,971,866 A | 7/1976 | Johnson ................ 428/41.4 |
| 4,058,647 A | 11/1977 | Inove .................. 428/476.1 |
| 4,087,588 A | 5/1978 | Shida et al. ............ 428/500 |
| 4,215,176 A | 7/1980 | Tuller et al. ........... 428/412 |
| 4,233,367 A | 11/1980 | Ticknor et al. ......... 428/476.2 |
| 4,361,628 A | 11/1982 | Krueger ................ 428/475.8 |

(List continued on next page.)

FOREIGN PATENT DOCUMENTS

| DE | 3243318 A1 | 6/1983 |
| EP | 1335791 | 3/1972 |
| EP | 0 016 617 A1 | 3/1980 |
| EP | 0 035 392 | 9/1981 |
| EP | 0 027 191 B1 | 3/1984 |

(List continued on next page.)

OTHER PUBLICATIONS

Zeelon. 355, James River Corporation, 1989.*
Kirk–Othmer, Encyclopedia of Chemical Technology, Fourth Edition, vol. 10, Explosives and Propellants to Flame Retardants for Textiles, A Wiley–Interscience Publication, John Wiley & Sons, Copyright 1993, *Film and Sheeting Materials,* pp. 775–777.

(List continued on next page.)

*Primary Examiner*—Leszek Kiliman
(74) *Attorney, Agent, or Firm*—O'Keefe, Egan & Peterman, LLP

(57) ABSTRACT

This invention concerns a multilayer film useful as release sheet for sheet molding compounds, comprising a first skin layer, a second skin layer, a barrier layer for monomeric resins wherein the barrier layer is between the first and second skin layers and the first and second skin layers comprise a mixture of polyolefin and adhesive resin. This invention also pertains to the multilayer films method of production, as well as an SMC sheet employing the multilayer film.

15 Claims, 2 Drawing Sheets

U.S. PATENT DOCUMENTS

| | | | |
|---|---|---|---|
| 4,397,916 A | 8/1983 | Nagano | 428/461 |
| 4,409,364 A | 10/1983 | Schmukler et al. | 525/74 |
| 4,444,829 A | 4/1984 | Bollen et al. | 428/220 |
| 4,460,632 A | 7/1984 | Adur et al. | 428/34.2 |
| 4,474,845 A | 10/1984 | Hagerman et al. | 428/297.4 |
| 4,568,505 A | 2/1986 | Bollen et al. | 264/172.19 |
| 4,617,240 A | 10/1986 | Krueger | 428/476.1 |
| 4,857,399 A | 8/1989 | Vicik | 426/28 |
| 4,959,189 A | 9/1990 | Rohrbacher et al. | 264/510 |
| 5,114,765 A | 5/1992 | Inada et al. | 428/35.7 |
| 5,126,085 A | 6/1992 | Thorp et al. | 264/112 |
| 5,565,160 A | 10/1996 | Makuuchi et al. | 264/485 |
| 5,601,770 A | 2/1997 | Maligie | 264/172.19 |

FOREIGN PATENT DOCUMENTS

| | | |
|---|---|---|
| EP | 0 322 045 A2 | 3/1984 |
| EP | 0 334 293 | 3/1989 |
| EP | 0 342 897 | 5/1989 |
| EP | 0 334 293 | 9/1989 |
| EP | 0 342 897 | 11/1989 |
| EP | 0 457 598 A2 | 5/1991 |
| EP | 0 595 220 | 10/1993 |
| FR | 2 132 395 | 11/1972 |
| JP | 7148897 | 6/1995 |
| WO | WO 95/15354 | 6/1995 |

OTHER PUBLICATIONS

Bollen et al., "Nylon Support Films for the Manufacture of SMC Products," 35$^{th}$ Annual Technical Conference, 1980, Reinforced Plastics/Companies Institute, The Society of the Plastics Industry, Inc., Section 7–C:1–3, 1980.

BYNEL CXA Series 4100—Product Information Sheet, "Series 4100 Including 4104, 4105, 4107, 4125, E364, and E409—Anhydride–Modified Linear Low–Density Polyethylene," DuPont.

ZEELON 354, James River Corporation, 1989.

"Compounding," by Irv J. Leichtle, 45$^{th}$ Annual Conference, Composites Institute, The Society of Plastics Industry, Inc., Feb. 12–15, 1990, pp. 2–B/1–2–B/6.

\* cited by examiner

CARRIER RELEASE SHEET FOR STYRENE MOLDING PROCESS AND PROCESS AND SYSTEM

This application is a continuation of co-pending application Ser. No. 09/406,494, filed Sep. 27, 1999, which is a continuation of application Ser. No. 08/909,541, filed Aug. 12, 1997, now U.S. Pat. No. 5,985,391, which claims priority from U.S. Provisional Application No. 60/023,818, filed Aug. 12, 1996.

BACKGROUND OF INVENTION

This invention concerns release sheets (films) useful in sheet molding compound applications, (SMC) thick (or "Takeda") molding compound (TMC) applications, or in bulk (or "dough") molding (BMC) applications. This invention also concerns sheet molding compounds made using the release sheets of this invention.

In various processes for producing sheet molding compounds, the process typically includes casting a layer of heat-curable thermosetting resin composition such as an unsaturated polyester composition containing styrene monomer, usually with chopped fiberglass and filler, onto a polymeric film as a release sheet and carrier sheet. Polymeric film is then also applied to the top surface of the heat-curable thermosetting resin composition to form a sandwich composition. The process includes passing the sandwich composition through a plurality of compaction rolls, and then winding the sandwich composition into a roll for partial curing and for later use, for example, in a compression molding system for pressure molded products. The polymeric release and carrier film is typically stripped off and disposed of prior to the compression molding step.

The polymeric carrier film provides a barrier for the particular monomer employed in the thermosetting resin, such as a styrene monomer, yet the film should be easily removable from the sandwich composite so produced. A polyamide polymeric film providing good barrier characteristics for the styrene monomer in the liquid resin is unsuitable for use, since the nylon tends to adhere to the styrene monomer heat-cured thermosetting resin, and is therefore difficult to remove.

A polymeric carrier film having release properties with low crystallinity has been proposed, with the polymeric film comprising a blend of a polyamide, such as nylon 6/66, together with an olefin of defined crystallinity, such as an ethylene vinyl acetate copolymer. Employment of the modified nylon carrier film is described, for example, in European patent application 0 027 191, published Mar. 21, 1984, which is hereby incorporated by reference. Desirable characteristics of such nylon modified support films in the manufacture of sheet molding compounds products has also been described in the publication "Nylon Support Films for the Manufacture of SMC Products," by P. Stuart Bollen et al, at the 35th Annual Technical Conference 1990, Reinforced Plastics Companies Institute, The Society of Plastics Industry, Inc., also hereby incorporated by reference. This publication sets forth the distinct advantages of the modified nylon carrier film with the employment of polyethylene (PE) film to support the formation of the SMC compounds. However, it was reported that PE film, at a low cost and per unit area, relatively inert and with non-adhesive properties, has been exceptionally permeable to the common volatile liquid aromatic hydrocarbons, such as benzene, toluene and styrene monomers, as employed in the heat-curable thermostatic styrene modified resins.

In addition, it may be appreciated that monomer components such as styrene are frequently employed in the resins as crosslinking agents. Undue loss of styrene may lead to useless batch of compound. Previously, the edges of the SMC and TMC have been styrene deprived because styrene could escape through the unsealed film, at the edges of the compound during the process and during maturation, after removal from the maturation area, and prior to molding. Trimming of styrene deprived edges can be a costly loss of compound to the end user.

It should be further noted that while it was possible previously to seal the edges of the film, the force required to pull the film apart was too great to do so without cutting of the film. Molders thus found that separation of the film from the SMC or TMC was inefficient and too expensive since special equipment was required. A need therefore exists for a film which can be sealed at the edges and then peeled apart so that molding compound can be used.

It is therefore desirable to provide for a new and improved, low cost and efficient carrier support film product for the manufacture of SMC, TMC, and BMC products in the processes for production thereof.

SUMMARY OF INVENTION

The present invention provides a solution to one or more of the disadvantages and deficiencies described above. Generally, this invention concerns a carrier release sheet (film), a method of preparation for the sheet, and the system and use of the sheet in sheet molding systems. The release sheet may also be used for TMC and BMC.

In one broad respect, this invention is a multilayer film useful as a release sheet for sheet molding compounds, comprising: (a) a first skin layer; (b) a second skin layer, (c) a barrier layer for monomeric resins wherein the barrier layer is between the first and second skin layers; and wherein the first and second skin layers comprise a mixture of polyolefin and adhesive resin.

In a second broad respect, this invention is a composite useful in molding compound applications, comprising: first and second multilayer release sheets, and a heat-curable resin layer between the first and second multilayer release sheets, wherein the first and second multilayer release sheets, comprise: (a) a first skin layer; (b) a second skin layer; (c) a barrier layer for the heat-curable resin wherein the barrier layer is between the first and second skin layers; and wherein the first and second skin layers comprise a mixture of polyolefin and adhesive resin.

In a third broad respect, this invention is a process for the manufacture of a carrier film, comprising: co-extruding a three layer film, wherein the layers comprise a first skin layer, a second skin layer, and a barrier layer for monomeric resins wherein the barrier layer is between the first and second layers, and wherein the first and second skin layers comprise a mixture of polyolefin and adhesive resin.

DETAILED DESCRIPTION OF THE INVENTION

Figure 1:
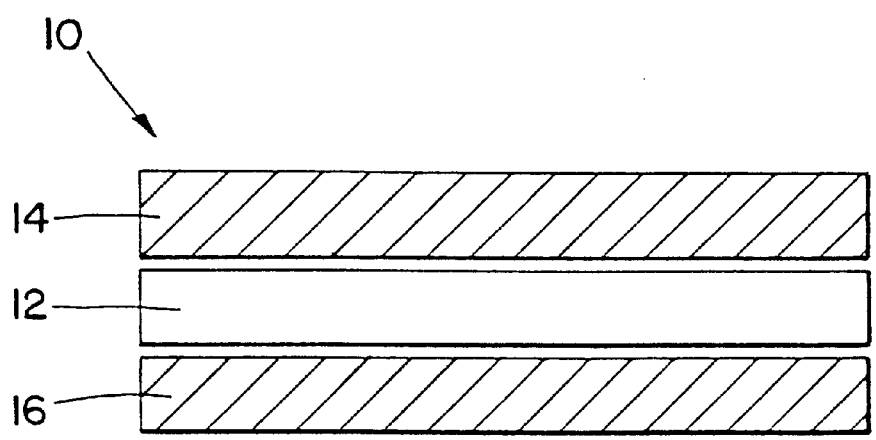
FIG. 1 is a sectional enlarged schematic view of the sheet material of the invention.

The carrier release sheet of this invention may be used to make a sandwich composite with a resin or cross-linkable polymeric resin such as unsaturated polyester, for example, sheet molding compound ("SMC"). Typically, molding compounds contain styrene monomer, a reinforcing agent such as fiberglass, and particulate filler such as calcium carbonate. Molding compound and methods of preparation thereof are described in U.S. Pat. No. 4,444,829.

The sheet may include a top extruded skin layer and a bottom extruded skin layer. The top and bottom skin layers may be the same or different. A skin layer may comprise a blended admixture of a high density polyalkylene or a linear polyalkylene. The polyalkylene wherein the alkylene groups each contain 2 to 18 carbon atoms. A representative example of high density polyalkylene is high density polyethylene (HDPE). The polyalkylenes may contain one or more different alkylene monomers. Representative examples of linear polyalkylenes include linear polyethylene including linear low density polyethylene (LLDPE), linear polyhexene, linear polybutene, linear polyoctene, and blends thereof. The admixture also contains a blended adhesive amount of a compatible adhesive resin to impart selected low adhesive bond strength to the center layer by the top and bottom skin layers.

The admixture which forms a skin layer may contain from about 20 to about 90 percent HDPE, alternatively from about 40 to about 60 percent by weight HDPE. The admixture may contain from about 20 to about 90 percent by weight linear polyalkylene, alternatively from about 25 to about 45 percent by weight. The admixture may also contain from about 10 to about 50 percent by weight of the adhesive resin, and in one embodiment of this invention may contain from about 20 to about 35 percent by weight of the adhesive resin. The top and bottom skin layers may also include, optionally, a low but effective amount of an antiblocking agent such as, but not limited to, particulate materials such as silica, which may be present in an amount ranging from about 0.1 to about 5 percent by weight.

The amount of adhesive resin in the admixture should be sufficient to impart low adhesive bond strength between the top and bottom layers to the center barrier layer. Preferably, the adhesive resin is compatible with the admixture. The adhesive resin, for example, may comprise an anhydride-modified polyolefin such as anhydride-modified LLDPE. The anhydride may be an acid anhydride such as, but not limited to, aromatic acid anhydrides such as phthalic anhydride, and unsaturated dicarboxylic anhydrides such as succinic and maleic acid anhydrides. One adhesive resin particularly suitable for use in the invention is an anhydride-modified LLDPE available from DuPont which is available under the name Bynel™ CXA 4164.

In one embodiment of this invention, the film's first skin layer is a non-seal layer which may contain from about 25 to about 90 percent by weight HDPE. The second sealant layer may contain from about 5 to about 90 percent HDPE and from about 5 to about 90 percent by weight LLDPE. The HDPE may have a density of about 0.96 or more to improve the water barrier characteristics of the film.

The center extruded layer may comprise any polymeric material which provides a barrier for a given monomer of a heat-curable resin composition. Preferably, the polymeric material is useful as a barrier to styrene monomer, which is present in resin compositions employed in the sheet molding industry. For example, the release sheet may comprise a center extruded polymeric barrier layer such as a polyamide. A representative example of one such polyamide is nylon 6/66, which is a copolyamide of hexamethylene diamine, adipic acid, and caprolactam.

The top and bottom skin layers may be heat-sealed to each other at the edges. In the sandwich composite, the top skin layer and the bottom skin layer adhere to the center barrier layer with low adhesive bond strength. The low strength bond permits the top and bottom skin layers, or both, to be easily peeled from the center barrier layer of the sandwich composite. The adhesive resin employed in the admixture may vary in composition. Since sheets may be sealed together, prior to compression rolling of a sandwich (formed of release film/molding compound/release film), the sealed edge serves to trap the compound in the sandwich. Similarly, because the sealed edge provides a barrier to styrene, styrene losses are significantly reduced such that compound losses are dramatically decreased through use of the release film of this invention. Furthermore, the sealed edge allows for the resin filler paste to be pushed to the sealed edges which become a resin-filler dam. A continuous weight of molding compound can thus be developed. That is, the weight per area at the center can be close to that at the edges. Advantageously, this characteristic may enable a molding compound user to weigh charges less frequently. Moreover, sealing of the edges further reduces loss of styrene of the molding compound. As a result, the film of this invention advantageously reduces the losses of molding compound heretofore frequently experienced by end users of such compound.

The multiple layer carrier release sheet of this invention may vary in total thickness. Typically, the sheet has a thickness of about 0.01 mils or more. In certain embodiments, the thickness may range from about 0.3 to about 2.0 mils, with skin layers generally ranging from about 0.1 to about 5 mils and the center layer typically ranging from about 0.1 to 10 mils. Cast processes may be used to make films having a thickness of up to about 20 mils (the film typically has a thickness of from about 0.5 mils to about 12 mils).

HDPE employed in the skin layers may have a density of about $0.94\pm10\%$. The polyalkylene, such as the polyoctene, may have a density of about $0.920\pm15\%$. The melt index of the HDPE may be about 0.2. The melt index of the polyalkylene may be about 1.0.

Advantageously, the film of this invention may be made using conventional processes. Thus, the film may be made using a blown film co-extrusion process. Likewise, a standard casting process may be employed to produce the release sheet of this invention.

The multiple layer release carrier sheet of the invention is particularly useful in forming sandwich composites with heat-curable styrene monomer resins, wherein the styrene monomer resin forming the center of the sandwich. The multiple layer release carrier sheets of the invention may be easily removed and typically have a low peelability bond strength between the skin layers and the center barrier, with the bond strength being about zero or substantially zero. The bond strength may be from about 0.6 to about 6 pounds. The sandwich composite may be used in a compression molding process such as to make, for example, automobile parts such as fenders. The multiple layer release carrier film may be easily removed and disposed of prior to the compression molding.

The release carrier sheet of the invention provides that the outer edges of the sandwich composite may be easily sealed to each other. Thus, this invention provides a sandwich composite with heat-sealed top and bottom edges. Furthermore, the ability to seal edges of the film allows a resin dam to build up during sandwich manufacture, thereby facilitating preparation of more continuous sheets. Moreover, sealed edges reduce styrene losses in the compound at edges of the sandwich. The sealed bond can be easily destroyed by interfacial peeling due to the top and bottom skin layers having low bond strength to the center barrier layer. Thus, when the edges of the top and bottom skins are heat-sealed together, the center (core) layer is unaffected, thereby permitting the easy removal of the skin layers by an operator.

The multiple layer carrier release film of the invention provides a very effective barrier for styrene or other monomers or volatile materials of the heat-curable thermosetting resins (e.g., SMC). The release film also provides top and bottom skin layers that may be easily removed from the barrier layer prior to the use of the sandwich composite. The release film may be heat-sealed along the edges in forming the sandwich composite.

It may be desirable to add a visible color agent to one or more of the extruded layers of the release sheet, such as the skin layers. This may provide greater visibility of the sheet material during use. Generally, a colored pigment or dye agent, like an orange pigment, is incorporated in the skin layer composition. The color agent may be added in an amount from about 0.1 to about 5.0% by weight. A color agent, if used, should preferably be selected such that the agent does not detrimentally affect sheet performance.

A three layer blown, co-extruded carrier release sheet of the invention has been prepared as shown in FIG. 1. The heat carrier release sheet so prepared was employed in preparing a sandwich composite. The three-layer co-extruded sheet was composed of the following layers:

| | | |
|---|---|---|
| 30% Skin (14) | 500 lbs. | HDPE 9640 Chevron (density 0.939; melt index, 0.20) |
| | 250 lbs. | Dow 2056B Linear Low Density Polyoctene (density 0.920; 1.0 Melt Index) |
| | 250 lbs. | 4164 DuPont Bynel ® adhesive resin (an LDPE based adhesive concentrate with anhydrides) |
| | 30 lbs. | Antiblock - Silica |
| | 30 lbs. | Orange color agent |
| 40% Center (12) | 1,000 lbs. | C35FN BASF Nylon 6/66 |
| 30% Skin (16) | 500 lbs. | HDPE 9640 Chevron (density 0.939; melt index, 0.20) |
| | 250 lbs. | Dow 2056B Linear Low Density Polyoctene (density 0.920; 1.0 Melt Index) |
| | 250 lbs. | 4164 DuPont Bynel ® adhesive resin (an LDPE based adhesive concentrate with anhydrides) |
| | 30 lbs. | Antiblock - Silica |

The resulting film had a moisture vapor transmission rate ("MVTR") of about 1.1 g/100 square inch/day at 90% relative humidity, as measured using ASTM F-1249.

FIG. 1 shows a sectional view of the multi-layer release sheet of the invention 10, which comprises a center extruded barrier layer 12 for styrene resins which may be comprised of nylon, a top extruded skin carrier layer 14, and a bottom extruded skin carrier layer 16. The skin layers 14 and 16 comprise an admixture of high density polyethylene (HDPE), a linear polyethylene (PE), an adhesive resin to impart selected adhesive properties to the HDPE and PE, and an antiblock agent.

Figure 2:
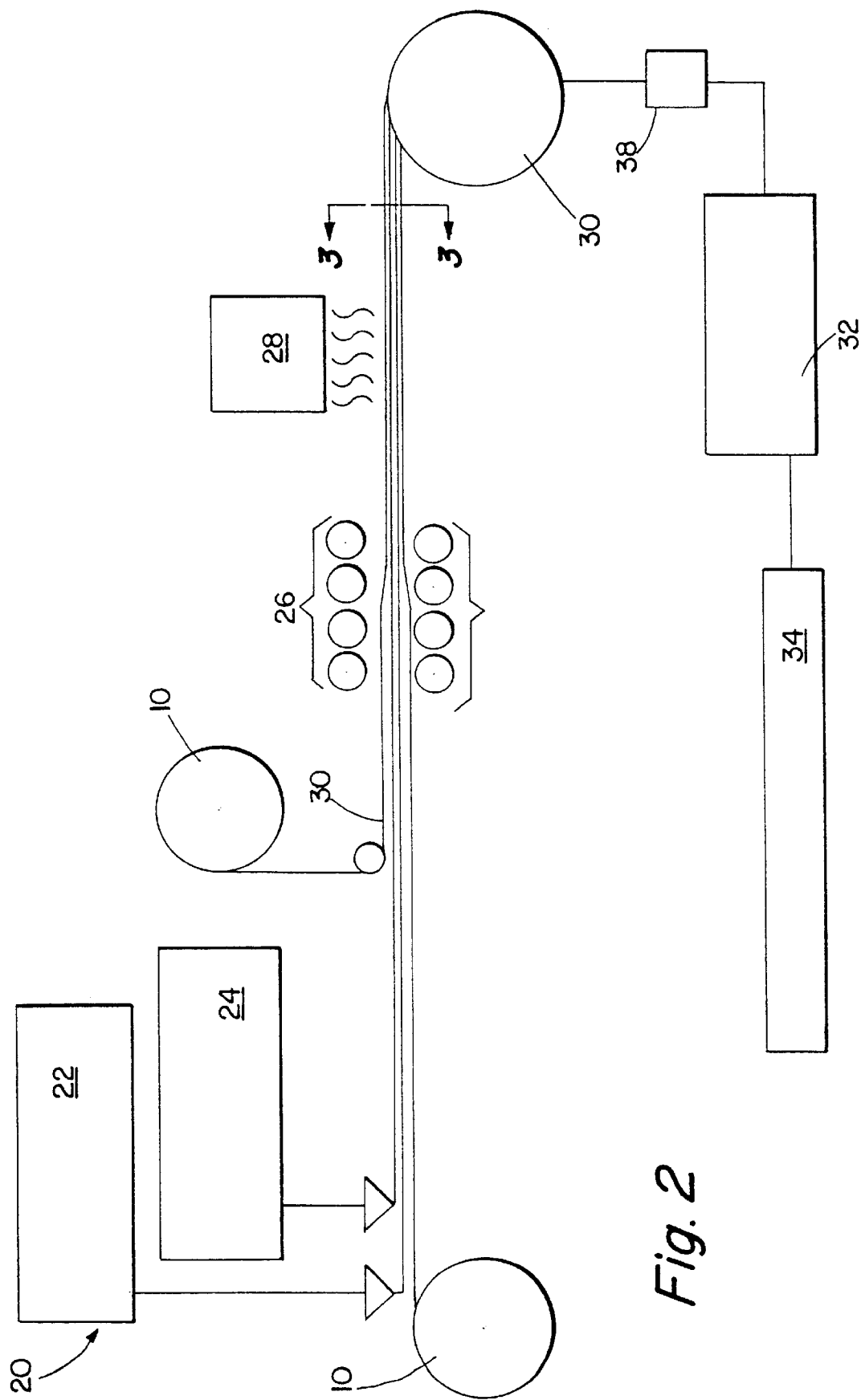
FIG. 2 is an illustrative schematic view of the process of preparing a resin composite sandwich employing the sheet material of FIG. 1.

FIG. 2 shows a process 20 of preparing a sandwich composite 30 for later use in a compression molding system using the sheet material 10 of FIG. 1. Sheet material 10 is unwound as a bottom carrier sandwich layer, and a layer of a heat-curable liquid styrene monomer resin 22 is cast onto the top surface of the sheet material 10 (e.g., ¼"–½") and chopped glass fiber 24 is deposited onto (or previously admixed with) resin 22. A second roll of sheet material 10 is unwound and pressed onto the top surface of the monomer/chopped glass fiber layer to form a sandwich 30. The sandwich is then subjected to compaction in a compaction area 26 by passage between a plurality of rolls to reduce the thickness of the sandwich, e.g., from 1–½" to ¼"–⅜". After compaction, the outer edges on each side of the sandwich 30 are heat-sealed together by an edge heat-sealer 28. The compacted, edge-sealed sandwich composite 30 may be rolled up for future use or may be sent to a compression mold station 32 for molding in a cured glass fiber resin product 34, after the top and bottom sheets 10 have been peeled from the resin-glass fiber layer 22–24 optionally at a peeling station 38. Alternatively, edge heat-sealer 28 may be positioned prior to compaction area 26.

Figure 3:
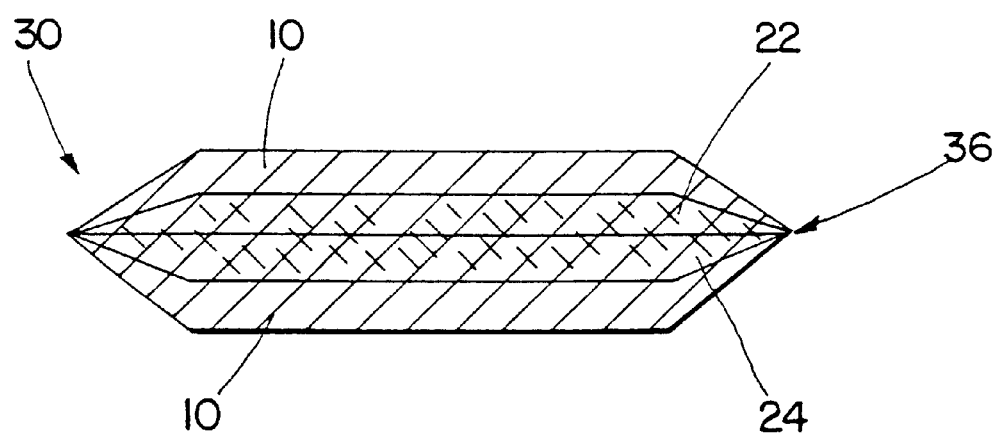
FIG. 3 is an enlarged sectional illustrative view along lines 3—3 of FIG. 2.

FIG. 3 is a sectional view along lines 3—3 of FIG. 2 showing the top and bottom sheets 10 heat-sealed 36 at each edge by the heat-sealable top and bottom skin layers of the sheet 10 to enclose the partially cured styrene monomer resin 22-glass fiber 24 layers.

Thus, the carrier release sheet of the invention provides for the effective aromatic hydrocarbon (e.g., styrene) barrier through the use of a nylon or blended nylon central layer, and permits the top and bottom skin layers to be easily removable from the center layer and prior to compression molding, for example. The carrier release sheet further permits the top and bottom skin layers to be edge heat-sealed together when forming the sandwich composite. The sandwich composite may subsequently be either placed in inventory or removed to a compression molder formation to be compression molded into a cured fiberglass reinforced product. The multiple layer carrier release sheet of the invention thus overcomes many of the disadvantages of the prior art, yet provides effective barrier coating, easy peelability, and edge heat sealing.

Another example of the film of this invention was made by co-extrusion in a manner similar to the above-described film. The film contained three layers, each layer having been prepared from the following amounts of components:

Non-seal skin layer (30% of film composite)
    750 lbs. (1650 Kg) HDPE (Chevron 9659T)
    250 lbs. (550 Kg) anhydride-modified polyolefin (DuPont, Bynel™4164)
    30 lbs. (166 Kg) Antiblock (Polyfil HD A/B)
    30 lbs. (66 Kg) Orange color agent
Center (core) layer (40%)
    1000 lbs. (2200Kg) nylon (BASF C35FN)
Sealant skin layer (30%)
    500 lbs. (1100 Kg) HDPE (Chevron 9640)
    250 lbs. (550 Kg) LLDPE (Exxon 163)
    250 lbs. (550 Kg) anhydride-modified polyolefin (DuPont, Bynel™4164)
    30 lbs. (66 Kg) Antiblock (Polyfil HD A/B)

The film was produced by co-extrusion using a blown film process using standard techniques. The first extruder used for the non-seal skin layer generated 180 pounds per hour using barrel temperatures set to 370° F., 410° F., 370° F., and 320° F. and pressure of 2770 psig. A second extruder generated 240 pounds per hour for the center layer using barrel temperatures set to 390° F., 400° F., 410° F., 420° F., 420° F. and pressure of 1470 psig. A third extruder generated 180 pounds per hour to form the sealant layer using barrel temperatures set to 370° F., 410° F., 390° F., 340° F., and 320° F., at a pressure of 5950 psig. The resulting three layer film surprisingly good water barrier properties. Thus, the nylon core retained its resiliency and was less prone to breakdown, thereby facilitating improved processing capability relative to the film above in which HDPE having a density of about 0.094 g/cc was employed in the skin layers. It is believed that the increase in HDPE density provides the decrease in water transmission through the skin layers. The film had the following physical properties at 0.95 mil: Impact, Dart Drop F50 (ASTM D-1709)<40 grams; tensile strength, ultimate MD 8068 psi; TD 6,993 psi (ASTM D-882); elongation, ultimate MD 349%, TD 406% (ASTM D-882); 1% Secant Modulus, MD-124, 257 psi, TD 135,054 psi (ASTM D-882); COF (slip), non-sealant 0.35, sealant 0.32 (ASTM D-1894); tear strength, MD-16 grams, TD -192 grams (ASTM D-1922); yield at 1.0 mil 27,144 square inch per pound; MVTR 0.2132 gram/100 square inch/day at 90% relative humidity. The film had excellent peel seal capabilities and was a stiffer film as compared to the above-identified exemplary film. It should be appreciated that the skin layers' thickness also contributes to water uptake with thicker films generally providing greater barrier to water. In addition, the film had excellent aromatic hydrocarbon barrier properties. It is believed that the nylon layer, including the thickness of the nylon layer, provides the enhanced styrene barrier properties of this invention's film.

It should be recognized that those persons skilled in the art may make various changes, modifications, improvements and additions to the invention described and claimed herein, all of which fall within the spirit and scope of the invention.

What is claimed is:

1. A three layer film useful as a release sheet for sheet molding compounds, comprising:
   (a) a first skin layer;
   (b) a second skin layer;
   (c) a barrier polyamide layer for monomeric resins wherein the barrier layer is between the first and second skin layers;
   wherein the first and second skin layers comprise a mixture of linear low density polyethylene and a maleic acid anhydride modified linear low density adhesive resin, wherein each skin layer comprises from 10 to about 35 percent of the maleic anhydride modified linear low density polyethylene.

2. The film of claim 1 wherein the first and second skin layers further comprise a second polyolefin made from two or more different monomers.

3. The film of claim 2 wherein the first skin layer's second polyolefin is high density polyethylene in an amount from about 25 to about 90 percent by weight of the skin layer, wherein the high density polyethylene has a density of about 0.96 or more.

4. The film of claim 1 wherein the second skin layer's polyolefin comprises a mixture of high density polyethylene and low linear density polyethylene, wherein the high density polyethylene comprises from about 25 to about 90 percent by weight of the second skin layer, and wherein the linear low density polyethylene comprises from about 5 to about 90 percent by weight of the second skin layer, wherein the high density polyethylene has a density of about 0.96 or more.

5. The film of claim 1 wherein the first skin layer, the second skin layer, or both the first and the second skin layers include an antiblock agent.

6. The film of claim 1 wherein the first skin layer, the second skin layer, or both the first and the second skin layers include a color agent.

7. A process for the manufacture of a carrier film comprising: co-extruding a three layer film, wherein the layers comprise a first skin layer, a second skin layer, and a polyamide barrier layer for monomeric resins wherein the barrier layer is between the first and second layers, and wherein the first and second skin layers comprise a mixture of polyolefin linear low density polyethylene and a maleic anhydride modified linear low density polyethylene adhesive resin, wherein the maleic anhydride modified linear low density polyethylene is present in each skin layer in amount from 10 to about 35 percent by weight of each layer.

8. The process of claim 7, wherein the co-extruding is performed using a blown film process.

9. The process of claim 7, wherein the maleic acid anhydride adhesive resin is a maleic anhydride-modified low linear density polyethylene that is present in an amount ranging from about 20 percent to about 35 percent.

10. The process of claim 7 wherein the first skin layer further comprises high density polyethylene.

11. The process of claim 7 wherein the first and second skin layers further comprise a second polyolefin made from two or more different monomers.

12. The process of claim 10 wherein the high density polyethylene is present in an amount from about 25 to about 90 percent by weight of the skin layer, wherein the high density polyethylene has a density of about 0.96 or more.

13. The process of claim 7 wherein the second skin layer comprises a mixture of high density polyethylene and low linear density polyethylene, wherein the high density polyethylene comprises from about 25 to about 90 percent by weight of the second skin layer, and wherein the linear low density polyethylene comprises from about 5 to about 90 percent by weight of the second skin layer, wherein the high density polyethylene has a density of about 0.96 or more.

14. The process of claim 7 wherein the first skin layer, the second skin layer, or both the first and the second skin layers include an antiblock agent.

15. The process of claim 7 wherein the first skin layer, the second skin layer, or both the first and the second skin layers include a color agent.

* * * * *

UNITED STATES PATENT AND TRADEMARK OFFICE
CERTIFICATE OF CORRECTION

PATENT NO.    : 6,562,425 B2  
DATED         : May 13, 2003  
INVENTOR(S)   : Daniel G. Denehy and Eric D. Tuttle It is certified that error appears in the above-identified patent and that said Letters Patent is hereby corrected as shown below:

<u>Title page, Item [54] and Column 1, lines 1-3,</u>
Please correct Title to read -- CARRIER RELEASE SHEET FOR MOLDING COMPOUND --

<u>Column 7,</u>
Line 2, after "film", please insert -- exhibited --.

Signed and Sealed this

Twenty-third Day of September, 2003

JAMES E. ROGAN
*Director of the United States Patent and Trademark Office*